US011270289B2

(12) United States Patent
Lu et al.

(10) Patent No.: US 11,270,289 B2
(45) Date of Patent: Mar. 8, 2022

(54) METHOD AND APPARATUS FOR RECOVERING INCOMPLETE TRANSACTION

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co. Ltd., Beijing (CN)

( * ) Notice: Subject to any disclaimer, the term of this patent is extended or adjusted under 35 U.S.C. 154(b) by 317 days.

(21) Appl. No.: 15/577,371

(22) PCT Filed: Jun. 8, 2016

(86) PCT No.: PCT/CN2016/085219
§ 371 (c)(1),
(2) Date: Nov. 28, 2017

(87) PCT Pub. No.: WO2017/016329
PCT Pub. Date: Feb. 2, 2017

(65) Prior Publication Data
US 2018/0165674 A1    Jun. 14, 2018

(30) Foreign Application Priority Data
Jul. 27, 2015   (CN) .......................... 201510445713.3

(51) Int. Cl.
*G06Q 20/34*   (2012.01)
*G06Q 20/38*   (2012.01)
*G06Q 20/10*   (2012.01)
*G06Q 20/40*   (2012.01)

(52) U.S. Cl.
CPC .......... *G06Q 20/34* (2013.01); *G06Q 20/105* (2013.01); *G06Q 20/389* (2013.01); *G06Q 20/401* (2013.01); *G06Q 2220/00* (2013.01)

(58) Field of Classification Search
CPC .... G06Q 20/34; G06Q 20/105; G06Q 20/389; G06Q 20/401; G06Q 2220/00
USPC ......................................................... 705/41
See application file for complete search history.

(56) References Cited

U.S. PATENT DOCUMENTS

| 5,278,982 | A | * | 1/1994 | Daniels | ............... G06F 11/1471 |
| 5,907,848 | A | * | 5/1999 | Zaiken | ................... G06Q 40/08 |
| 6,856,993 | B1 | * | 2/2005 | Verma | ................ G06F 16/1865 |
| 2002/0107837 | A1 | * | 8/2002 | Osborne | ............ G06F 16/2365 |

(Continued)

*Primary Examiner* — William J Jacob
(74) *Attorney, Agent, or Firm* — Hammer & Associates, P.C.

(57) ABSTRACT

A method for recovering an incomplete transaction, includes: step S1: a terminal judges whether a record matching a current transaction identifier exists in records in an incomplete transaction log; step S2: the terminal acquires data recovery data object list related data from the record matching the current transaction identifier; step S3: the terminal generates a recovery application command according to the data recovery data object list related data, sends the recovery application command to a smart card, and receives second response data returned by the smart card; and step S4: the terminal completes a transaction according to the record and data in a terminal database, and ends the procedure. The present invention prevents data in the smart card from being repeatedly processed in the incomplete transaction.

8 Claims, 3 Drawing Sheets

(56) References Cited

U.S. PATENT DOCUMENTS

| | | | | |
|---|---|---|---|---|
| 2003/0126229 A1* | 7/2003 | Kantor | .................... | G06F 9/546 |
| | | | | 709/217 |
| 2003/0200212 A1* | 10/2003 | Benson | ................. | G06F 16/252 |
| 2007/0261054 A1 | 11/2007 | Chesebro et al. | | |
| 2010/0274722 A1* | 10/2010 | Roberts | ................. | G07F 7/1008 |
| | | | | 705/44 |

* cited by examiner

METHOD AND APPARATUS FOR RECOVERING INCOMPLETE TRANSACTION

FIELD OF THE INVENTION

The present invention relates to a method for recovering an incomplete transaction and a device thereof, which belongs to the field of communication technology.

PRIOR ART

When a smart card is communicated with a terminal, an incomplete transaction may be happened if the smart card is separated from the terminal before the transaction is completed. If the transaction is incomplete, a user needs to communicate the smart card with the terminal one more time. For instance, an offline balance of the smart card will be reduced in a pre-payment or a pre-authorization of the smart card even though the transaction is incomplete, in that case, the balance of the smart card should not be reduced when the user communicates the smart card with the terminal again; but the terminal updates data read from the smart card and then writes the data into the smart card when the user communicates the smart card with the terminal again because a record in the terminal is different from a record in the smart card, which means that the data in the smart card is updated again, thus, the data in the smart card is incorrect.

SUMMARY OF THE INVENTION

The object of the present invention is to provide a method for recovering an incomplete transaction, which permits to recover the incomplete transaction on one hand, and data in the smart card is not effected on the other hand, and prevents the data in the smart card from being processed repeatedly in an incomplete transaction.

The other object of the present invention is to provide a device for recovering incomplete transaction, which permits to restore the incomplete transaction on one hand, and the data in the smart card is not effected on the other hand, and prevents the data in the smart card from being processed repeatedly in an incomplete transaction.

Thus, according to one aspect of the invention, there is provided a method for recovering an incomplete transaction, including:

Step S1, determining, by a terminal, whether any record matching with a current transaction identification exist in an incomplete transaction log, if yes, executing Step S2; otherwise, ending the process;

Step S2, obtaining, by the terminal, data recovery data object list related data from the record matching with the current transaction identification;

Step S3, generating, by the terminal, a recovering application command according to the data recovery data object list related data, and sending the recovering application command to the smart card, and receiving a second response data returned from the smart card; and Step S4, finishing, by the terminal, the transaction according to the records in the incomplete transaction log and data in a terminal database, and completing the process.

Preferably, before Step S1, the method further includes:

Step S0-1, determining, by the terminal, whether any record exists in the incomplete transaction log in the terminal, if yes, executing Step S1; otherwise, executing Step S0-2; and Step S0-2, obtaining, by the terminal, a generating application ciphertext command according to a card risk management data object list, and sending the generating application ciphertext command to the smart card, receiving a first response data returned from the smart card, and the transaction is finished, and the process is ended;

in Step S1, when the terminal determines that no record matching the current transaction identification exists in the incomplete transaction log, the method further includes: executing Step S0-2.

Preferably, Step S0-1 specifically includes: looking up, by the terminal, a record tag from the incomplete transaction log, and determining whether any record tag can be found, if yes, there exists a record in the incomplete transaction log in the terminal; otherwise, no record is in the incomplete transaction log in the terminal.

Preferably, after the terminal sends the generating application ciphertext command to the smart card in Step S0-2, the method further includes:

Step A1, determining, by the terminal, whether the first response data returned from the smart card is received, if yes, the terminal completing the transaction, and the process is finished; otherwise, executing Step A2; and Step A2, obtaining, by the terminal, data build data recovery data object list related data from a terminal database according to the data recovery data object list, and generating an incomplete transaction temporary record according to the data recovery data object list related data, storing the incomplete transaction temporary record into the incomplete transaction log, and the process is finished.

Preferably, Step S1 specifically includes:

Step B1, obtaining, by the terminal, the first record in the incomplete transaction log as a current record;

Step B2, determining, by the terminal, whether a primary account number serial number of the current transaction is empty, if yes, executing Step B3; otherwise, executing Step B4;

Step B3, determining, by the terminal, whether a primary account number in the current record is just the same as a primary account number of the current transaction, and whether no primary account number serial number exists in the current record, if yes, the record, which matches with the current transaction identification, existing in the incomplete transaction log, and executing Step S2; otherwise, executing Step B5;

Step B4, determining, by the terminal, whether the primary account number in the current record is just the same as the primary account number of the current transaction, and whether the primary account number serial number in the current record is just the same as the primary account number serial number of the current transaction, if yes, the record, which matches with the current transaction identification, existing in the incomplete transaction log, and executing Step S2; otherwise, executing Step B5; and Step B5, determining, by the terminal, whether any record exists behind a current record in the incomplete transaction log, if yes, making a next record of the current record as a current record, and returning to Step B2; otherwise, process is finished;

Step S2 specifically includes: obtaining, by the terminal, the data recovery data object list related data from the current record;

Step S4 specifically includes: completing, by the terminal, the transaction according to the current record and data in the terminal database, and ending the process.

Preferably, Step S2 specifically includes:

Step S2-1, obtaining, by the terminal, the first data element from the record which matches with the current transaction identification as a current data element;

Step S2-2, determining, by the terminal, whether a tag value of the current data element is a first preset value, if yes, executing Step S2-4; otherwise, executing Step S2-3;

Step S2-3, determining, by the terminal, whether any data element exists behind the current data element in the record, if yes, obtaining the next data element of the current data element as an updated current data element, and returning to Step S2-2; otherwise, ending the process; and Step S2-4, continuing, by the terminal, to obtain a length of the current data element, and obtaining a content of the current data element according to the length of the current data element, and making the current data element, the length of the current data element, and the content of the current data element as the data recovery data object list related data.

Preferably, before Step S4, the method further includes: determining, by the terminal, whether the second response data returned from the smart card is received by the terminal, if yes, executing Step S4; otherwise, ending the process.

Preferably, before Step S4, the method further includes:

Step C1, determining, by the terminal, whether a response code in the second response data is correct, if yes, executing Step S4; otherwise, executing Step C2;

Step C2, obtaining, by the terminal, the generating application ciphertext command according to the card risk management data object list, and sending the generating application ciphertext command to the smart card;

Step C3, determining, by the terminal, whether a third response data returned from the smart card is received, if yes, executing Step C4; otherwise, executing Step C5;

Step C4, deleting, by the terminal, the record from the incomplete transaction log, finishing the transaction, and the process coming to an end; and Step C5, generating, by the terminal, an incomplete transaction temporary record according to the data build data recovery data object list related data of the current transaction and the data recovery data object list related data, and updating the record in the incomplete transaction log according to the incomplete transaction temporary record.

Preferably, Step S4 specifically includes: updating, by the terminal, the data in the terminal database according to each data element in the records in the incomplete transaction log, deleting the records in the incomplete transaction log, and completing the transaction according to the data in the terminal database, and then ending the process.

Preferably, Step S4 specifically includes: completing, by the terminal, the transaction according to each data element in the records in the incomplete transaction log and the data in the terminal database, deleting the records from the incomplete transaction log, and then ending the process.

Preferably, the method further includes: clearing, by the terminal, the records in the incomplete transaction log.

According to the other aspect of the present invention, there is provided a device for recovering an incomplete transaction, which includes a first determining module, a first obtaining module, a first generating module, a sending module, a receiving module and a completing transaction module, in which the first determining module is configured to determine whether any record matching with a current transaction identification exists in the incomplete transaction log;

the first obtaining module is configured to obtain data recovery data object list related data from the record matching with the current transaction identification in the case that the first determining module determines that there exists a record, matching with the current transaction identification, in the incomplete transaction log;

the first generating module is configured to generate a recovering application command according to the data recovery data object list related data obtained by the first obtaining module;

the sending module is configured to send the recovering application command generated by the first generating module to the smart card;

the receiving module is configured to receive the second response data returned from the smart card; and the completing transaction module is configured to complete the transaction according to the records in the incomplete transaction log and data in the terminal database.

Preferably, the device further includes a second determining module and a second generating module;

the second determining module is configured to determine whether any record exists in the incomplete transaction log in the terminal, if yes, triggering the first determining module to work;

the second generating module is configured to obtain a generating application ciphertext command according to a card risk management data object list in the case that the second determining module determines that no record exists in the incomplete transaction log in the terminal;

the sending module is further configured to send the generating application ciphertext command generated by the second generating module to the smart card;

the receiving module is further configured to receive the first response data returned from the smart card; and the completing transaction module is further configured to complete the transaction after the first response data is received by the receiving module.

Preferably, the first determining module includes a first obtaining unit, a second determining unit, a third determining unit, a fourth determining unit and a fifth determining unit, in which the first obtaining unit is configured to obtain the first record from the incomplete transaction log as a current record;

the second determining unit is configured to determine whether a primary account number serial number of the current transaction is empty;

the third determining module is configured to determine whether the primary account number in the current record is just the same as the primary account number of the current transaction and no primary account number serial number exists in the current record in the case that the second determining unit determines the primary account number serial number of the current transaction is empty, if yes, there exists a record matching with the current transaction identification in the incomplete transaction log, and the first obtaining module is triggered to work;

the fourth determining unit is configured to determine whether the primary account number in the current record is just the same as the primary account number of the current transaction on one hand, and the primary account number serial number in the current record is just the same as the primary account number serial number of the current transaction on the other hand in the case that the second determining unit determines that the primary account number serial number of the current transaction is not empty, if yes, there exists a record matching with the current transaction identification in the incomplete transaction log, and the first obtaining module is triggered to work;

the fifth determining unit is configured to determine whether any record exists behind the current record in the incomplete transaction log in the case that the determination either by the third determining unit or by the fourth determining unit is no, if yes, making the next record of the current record as a current record, and triggering the second determining unit to work;

the first obtaining module is specifically configured to obtain the data recovery data object list related data from the current record; and the completing transaction module is specifically configured to complete the transaction according to the current record and the data in the terminal database.

Preferably, the first obtaining module includes a second obtaining unit, a sixth determining unit, a seventh determining unit and a third obtaining unit, in which the second obtaining unit is configured to obtain the first data element from the record matching with the current transaction identification as the current data element;

the sixth determining unit is configured to determine whether a tag value of the current data element is the first preset value;

the seventh determining unit is configured to determine whether any data element exists behind the current data element in the record in the case that the sixth determining unit determines that the tag value of the current data element is not the first preset value, if yes, obtaining a next data element of the current data element as an updated current data element, and triggering the sixth determining unit to work; and the third obtaining unit is configured to continue to obtain a length of the current data element in the case that the sixth determining unit determines the tag value of the current data element is the first preset value, and continue to obtain a content of the current data element according to the length of the current data element, and the terminal makes the current data element, the length of the current data element and the content of the current data element as the data recovery data object list related data.

Preferably, the device further includes a sixth determining module which is configured to determine whether the second response data returned from the smart card is received, if yes, triggering the completing transaction module to work.

Preferably, the device further includes a seventh determining module, a second generating module, an eighth determining module, a third generating module and a storing module, in which the seventh determining module is configured to determine whether a response code in the second response data is correct, if yes, triggering the completing transaction module to work;

the second generating module is configured to obtain a generating application ciphertext command according to a card risk management data object list in the case that the seventh determining module determines the response code in the second response data is incorrect;

the sending module is further configured to send the generating application ciphertext command generated by the second generating module to the smart card;

the receiving module is further configured to receive the third response data returned by the smart card;

the eighth determining module is configured to determine whether the third response data returned from the smart card is received by the receiving module, if yes, deleting the records from the incomplete transaction log;

the completing transaction module is further configured to complete the transaction in the case that the eighth determining module determines the third response data returned from the smart card is received;

the third generating module is configured to generate the incomplete transaction temporary record according to the data build data recovery data object list related data of the current transaction and the data recovery data object list related data in the case that the eighth determining module determines the third response data returned from the smart card is not received; and the storing module is configured to update the records in the incomplete transaction log according to the incomplete transaction temporary record.

Preferably, the completing transaction module is specifically configured to update the data in the terminal database according to each data element in the record, and delete the record from the incomplete transaction log, and complete transaction according to the data in the terminal database.

Preferably, the completing transaction module is specifically configured to complete the transaction according to each data element in the record and the data in the terminal database, and delete the record from the incomplete transaction log.

Preferably, the device further includes a clearing module, which is configured to clear the records in the incomplete transaction log.

Compared with the prior art, the present invention permits to recover an incomplete transaction, thus, it can prevent data in a smart card from being repeatedly processed.

DETAILED DESCRIPTION OF THE INVENTION

The technical solutions in the Embodiments of the present invention are further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

Figure 1:
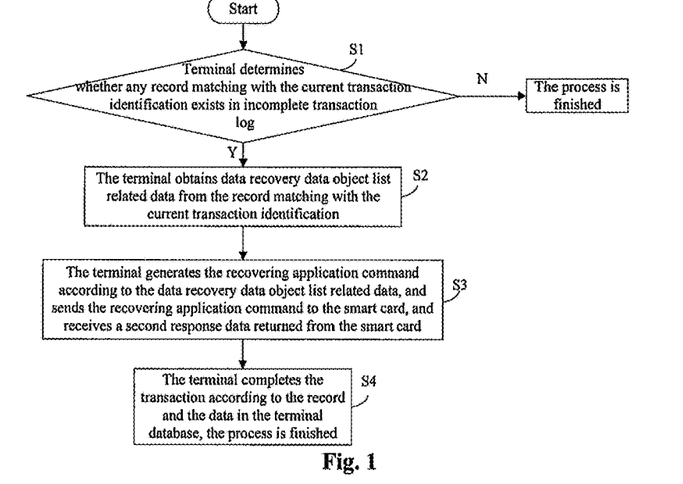
FIG. 1 shows a schematic of a method for recovering an incomplete transaction according to Embodiment 1 of the present invention.

It provides a method for recovering an incomplete transaction according to Embodiment 1 of the present invention, as shown in FIG. 1, the method includes:

Step S1, a terminal determines whether any record which matches with a current transaction identification exists in an incomplete transaction log, if yes, goes to Step S2; otherwise, the process comes to an end;

specifically, the current transaction identification includes a primary account number of the current transaction and a primary account number serial number of the current transaction;

Step S2, the terminal obtains data recovery data object list related data from the record which matches with the current transaction identification;

Step S3, the terminal generates a recovering application command according to the data recovery data object list related data, and sends the recovering application command to the smart card, and receives a second response data returned from the smart card;

Step S4, the terminal completes the transaction according to the record and the data in the terminal database, and the process is completed.

Embodiment 2

Figure 2:
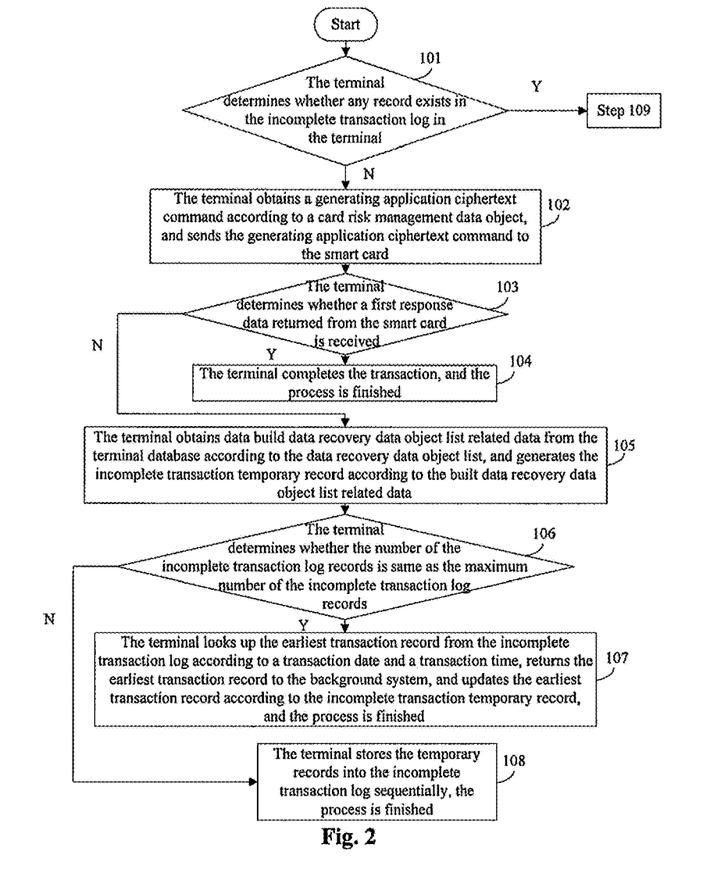
FIG. 2, FIG. 3 and FIG. 4 show schematics of a method for recovering an incomplete transaction according to Embodiment 2 of the present invention.
Figure 3:
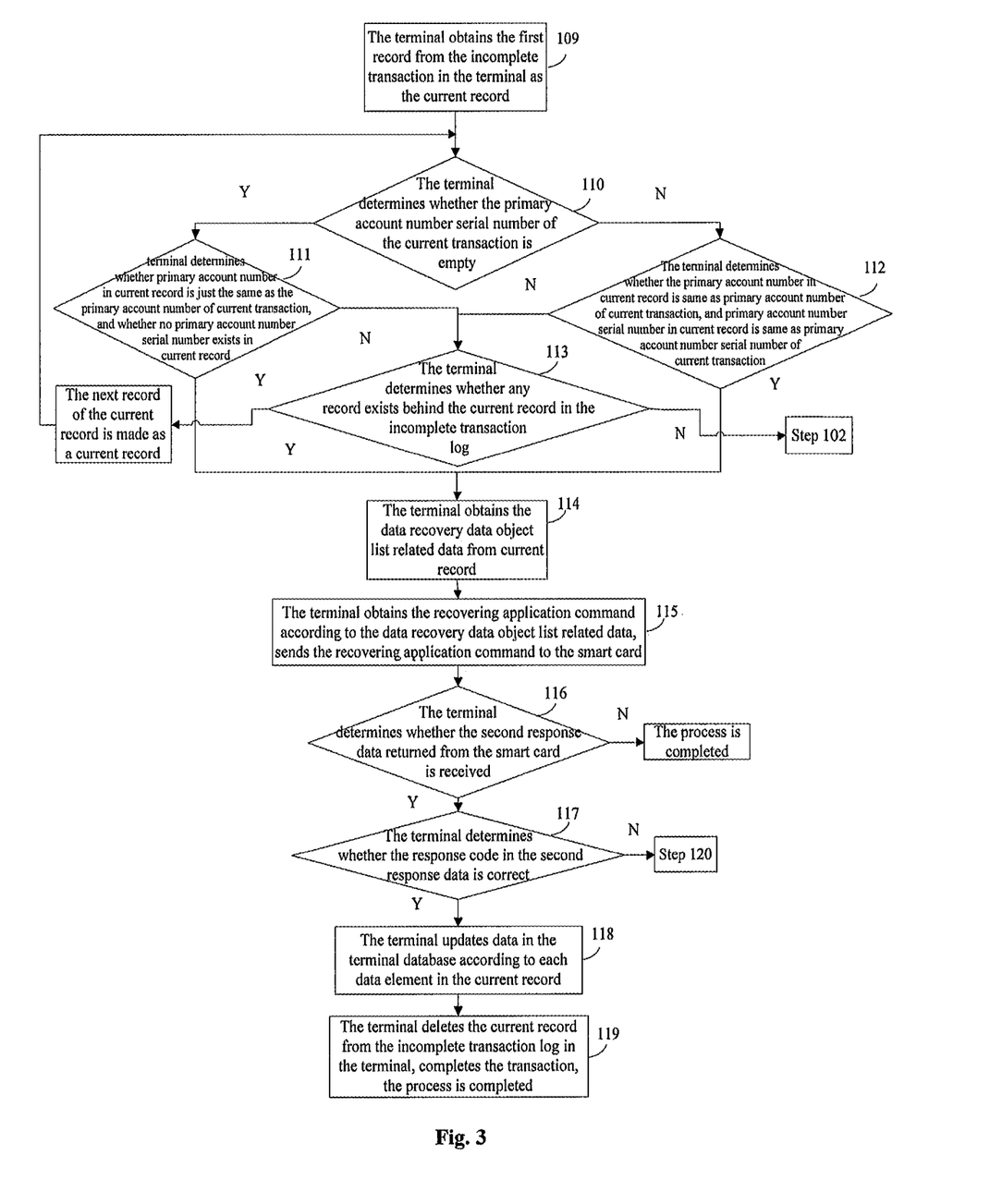
Figure 4:
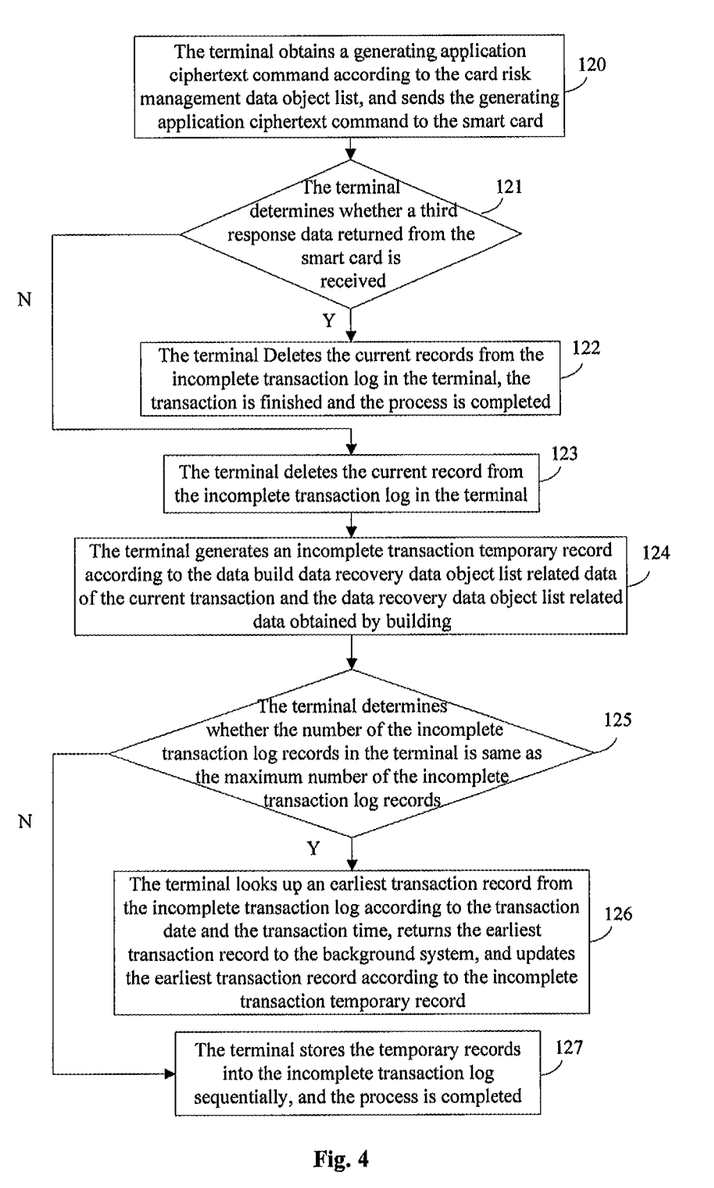

It provides a method for recovering an incomplete transaction according to Embodiment 2 of the present invention, as shown from FIG. 2 to FIG. 4, the method includes:

Step 101, the terminal determines whether any record exists in the incomplete transaction log in the terminal, if yes, goes to Step 109; otherwise, goes to Step 102;

specifically, the terminal looks up a record tag from the incomplete transaction log, and determines whether any record tag is found, if yes, there exists a record in the incomplete transaction log in the terminal; otherwise, no record exists in the incomplete transaction log in the terminal;

for instance, no record exists in the incomplete transaction log in the terminal in the case that the record tag is FF 81 01 and the incomplete transaction log is 9F 4D 02 01 01;

in Embodiment 2, one record in the incomplete transaction log in the terminal corresponds to one smart card;

in Embodiment 2, before Step 101, the method further includes: the terminal determines whether transaction recovery is supported, if yes, goes to Step 101; otherwise, goes to Step 102;

specifically, the terminal determines whether it can read a data recovery data object list, which is not empty, from the smart card by reading records from the smart cart, and determines whether a current configuration of the terminal supports transaction recovery, if both of the determination is yes, the terminal supports transaction recovery; otherwise, the terminal does not support transaction recovery; in which, the terminal determines whether the maximum number of the incomplete transaction log records in the terminal is not 0, if yes, the current configuration of the terminal supports transaction recovery; otherwise, the current configuration of the terminal does not support transaction recovery;

for instance, the terminal obtains reading record response data returned from the smart card by sending a reading record command to the smart card, and the reading record response data is 70 52 5F 24 03 49 12 31 5A 08 54 13 33 90 00 00 66 77 5F 34 01 02 8C 0E 95 05 9F 02 06 9F 34 03 9F 33 03 9F 37 04 8E 0A 00 00 00 00 00 00 00 00 00 00 9F 0D 05 00 00 00 00 00 9F 0E 05 00 00 00 00 00 9F 0F 05 00 00 00 00 00 9F 51 03 9F 37 04 9F 4A 01 82 90 00; the terminal looks up a tag of the data recovery data object list, which is 9F 51, from the reading record response data, obtains data at the next byte of the tag of the data recovery data object list as a length of the data recovery data object list, which means the length is 03; and continues to obtain data as a content of the data recovery data object list according to the length of the data recovery data object list, that means the content is 9F 37 04; thus, the terminal determines that the data recovery data object list, which is not empty, is read from the smart card; for instance, the current configuration of the terminal supports transaction recovery in the case that the maximum number of the incomplete transaction log records in the terminal is 1;

Step 102, the terminal obtains a generating application ciphertext command according to a card risk management data object list, and sends the generating application ciphertext command to the smart card;

specifically, the terminal obtains the card risk management data object list by reading records from the smart card, and obtains a tag and a length of a data element in the card risk management data object list, and looks up a value of the data element from the terminal database according to the tag and the length of the data element, and build related data of the card risk management data object list according to the value of the found data element;

for instance, the tag of the card risk management data object list found by the terminal from the reading record response data is 8C; the data at the next byte of the tag of the card risk management data object list is obtained as the length of the card risk management data object list, which is 0E; the data is obtained by the terminal as the content of the card risk management data object list according to the length of the card risk management data object list, which means the content is 95 05 9F 02 06 9F 34 03 9F 37 04; the terminal obtains the tag and the length of the data element from the content of the card risk management data object list, and looks up a corresponding value of the data element from the terminal database according to the tag and the length of the data element, the related data of the card risk management data object list which is built according to the value of the found data element is 00 00 00 00 00 00 00 00 00 15 00 3F 00 00 00 60 08 81 06 2A 95, and the generating application ciphertext command, obtained by the terminal according to a type of the command, a command code, a first parameter, a second parameter and the related data of the card risk management data object list, is 80 AE 50 00 00 00 00 00 00 00 00 00 15 00 3F 00 00 00 60 08 81 06 2A 95 00;

Step 103, the terminal determines whether the first response data returned from the smart card is received, if yes, goes to Step 104; otherwise, goes to Step 105;

specifically, that the terminal determines that the first response data returned from the smart card is not received includes that the first response data is not received because of timeout or communication error;

Step 104, the terminal completes the transaction, and the process is finished;

Step 105, the terminal obtains the data build data recovery data object list related data according to the data recovery data object list, and generates the incomplete transaction temporary record according to the data recovery data object list related data obtained by building;

in Embodiment 2, before the step, the method further includes: the terminal determines whether it supports transaction recovery, if yes, goes to Step 105; otherwise, the transaction fails, and the process is finished;

specifically, the terminal reads records from the smart card, and determines whether any data recovery data object list which is not empty is read from the smart card, and whether the current configuration of the terminal supports transaction recovery, if both of the determinations are yes, the terminal supports transaction recovery; otherwise, the terminal does not support transaction recovery;

in Embodiment 2, in the case that the terminal determines that it does not support transaction recovery, the method further includes: the terminal displays information that transaction fails and restart the transaction;

specifically, in Step 105, the terminal obtains the data recovery data object list by reading records from the smart card, and obtains the tag and the length of the data element from the data recovery data object list, and looks up a value of the corresponding data element according to the obtained tag and the length of the data element, and builds the data recovery data object list related data according to the value of the data element;

for instance, the terminal looks up the tag of the data recovery data object list, which is 9F 51, from the reading record response data, the data at the next byte of the tag of the data recovery data object list, which is obtained as the length of the data recovery data object list, is 03; the content of the data recovery data object list, which is obtained according to the length of the data recovery data object list, is 9F 37 04; the tag of the data element obtained from the data recovery data object list is 9F 37, and the length of the data element obtained from the data recovery data object list is 04, and the value of the corresponding date element is looked up by the terminal, and the data recovery data object list related data, which is built according to the value of the data element, is DF 81 13 04 81 06 2A 95;

for instance, the incomplete transaction temporary record includes: a log entry, an authorized amount, other amount, an application primary account number, an application primary account number serial number, reading the balance before generating application ciphertext, a card risk management data object list related data, a verification result of the card holder, a data recovery data object list related data, a data storage abstract, an integrated data storage status, a terminal serial number, processing options data object list relate data, a reference control parameter, a terminal capacity, a terminal state code, a type of terminal, a verification result of terminal, a transaction category code, a transaction currency code, a transaction date, a transaction time, a type of transaction and a casual number;

for instance, the incomplete transaction temporary record is

FF8101818B9F020600000000015009F03060000000000-005A085413339000006775F3401 02DF810715000000-000000000000015003F000000600881062A959F34033F0-000DF8113048106 2A959F1E0811223344556677-88DF81110A000000001500000008009F33030000089F-1A02097 89F3501229505000000000009A031505299F2-1031524399C01009F370481062A95;

Step 106, the terminal determines whether the number of the incomplete transaction log records is just the same as the maximum number of the incomplete transaction records, if yes, goes to Step 107; otherwise, goes to Step 108;

for instance, the incomplete transaction log in the terminal is 9F 4D 02 01 01, and the terminal looks up a record tag from the incomplete transaction log, the number of the incomplete transaction log records in the terminal is 0 in the case that the record tag is not found; the terminal determines that the number of the incomplete transaction log records is different from the maximum number of the incomplete transaction log records in the case that the maximum number of the incomplete transaction log records is 1, and Step 108 is executed;

Step 107, the terminal looks up the earliest transaction record from the incomplete transaction log according to the transaction date and the transaction time, and returns the earliest transaction record to background system, and updates the earliest transaction record according to an incomplete transaction temporary record, and finishes the process;

specifically, that the terminal looks up the earliest transaction record from the incomplete transaction log according to the transaction date and the transaction time includes:

Step 107-1, the terminal obtains the first record from the incomplete transaction log in the terminal as a current record and the earliest transaction record, and obtains the transaction date and the transaction time according to a tag of the transaction date and a tag of the transaction time;

Step 107-2, the terminal determines whether any record exists behind the current record in the incomplete transaction log, if yes, the next record of the current record is made as a current record, and Step 107-3 is executed; otherwise, the earliest transaction record is found;

Step 107-3, the terminal obtains the transaction date and the transaction time from the current record according to the label of the transaction date and the label of the transaction time;

Step 107-4, the terminal determines whether the current record is earlier than the earliest transaction record according to the transaction date and the transaction time in the current record and the transaction date and the transaction time in the earliest transaction record, if yes, the current record is made as the earliest transaction record, and Step 107-2 is executed; otherwise, Step 107-2 is executed;

in Embodiment 2, the step further includes: the terminal displays the information that the transaction fails and restart the transaction;

Step 108, the terminal stores the incomplete transaction temporary records into the incomplete transaction log sequentially, and finishes the process;

for instance, after the temporary record is stored into the incomplete transaction log sequentially, the incomplete transaction log is 9F4D020101FF8101818B9F02060000000015009F030-60000000000005A08541333900000 66775F340102-DF81071500000000000000000000015003F0000006008810-62A959F34033F0000D F81130481062A959F1E0811223-34455667788DF81110A00000000150000000800F3303-0000 089F1A0209789F350122950500000000009A0-31505299F21031524399C01009F370481062A9 5;

in Embodiment 2, the step further includes: the terminal displays the information that the transaction fails and restart the transaction;

Step 109, the terminal obtains the first record from the incomplete transaction log in the terminal as a current record;

Step 110, the terminal determines whether a primary account number serial number of the current transaction is empty, if yes, goes to Step 111; otherwise, goes to Step 112;

specifically, the terminal obtains the primary account number serial number of the current transaction by reading records from the smart card;

Step 111, the terminal determines whether the primary account number in the current record is just the same as the primary account number of the current transaction, and whether no primary account number serial number exists in the current record, if yes, goes to Step 114; otherwise, goes back to Step 113;

specifically, the terminal obtains the primary account number of the current transaction by reading records from the smart card;

Step 112, the terminal determines whether the primary account number in the current record is just the same as the primary account number of the current transaction, and whether the primary account number serial number in the current record is just the same as the primary account number serial number of the current transaction, if yes, goes to Step 114; otherwise, goes back to Step 113;

specifically, the terminal obtains the primary account number of the current transaction by reading records from the smart card;

for instance, the terminal looks up the tag of the primary account number, which is 5A, from the reading record response data, obtains data at the next byte of the tag of the primary account number as a length of the primary account number, and the length is 08; and obtains data as a content of the primary account number according to the length of the primary account number, and the content is 54 13 33 90 00 00 66 77; the terminal looks up the tag of the primary account number serial number, which is 5F34, from the reading record response data, and obtains data at the next byte of the tag of the primary account number serial number as the length of the primary account number, and the length is 01; and obtains data as the content of the primary account number according to the length of the primary account number serial number and the content is 02;

the terminal looks up the tag of the primary account number, which is 5A, from the current record, obtains data at the next byte of the tag of the primary account number as the length of the primary account number, and the length is 08; and obtains data as the content of the primary account number according to the length of the primary account number, and the content is 54 13 33 90 00 00 66 77; the terminal looks up the tag of the primary account number serial number, which is 5F34, from the current record, and obtains data at the next byte of the tag of the primary account number serial number as the length of the primary account number, and the length is 01; and obtains data as the content of the primary account number according to the length of the primary account number serial number and the content is 02; thus, the primary account number in the current record is just the same as the primary account number of the current transaction; and the primary account number serial number in the current record is just the same as the primary account number serial number of the current transaction;

Step 113, the terminal determines whether any record exists behind the current record in the incomplete transaction log in the terminal, if yes, the next record of the current record is made as a current record, and Step 110 is returned to; otherwise, Step 102 is returned to;

Step 114, the terminal obtains data recovery data object list related data from the current record;

specifically, Step 114 includes:

Step 114-1, the terminal obtains the first data element from the current record as the current data element;

Step 114-2, the terminal determines whether a tag value of the current data element is a first preset value, if yes, goes to Step 114-4; otherwise, goes to Step 114-3;

for instance, the first preset value is DF 81 13;

Step 114-3, the terminal determines whether any data element exists behind the current data element in the current record, if yes, the next data element of the current data element is obtained as an updated current data element, and Step 114-2 is returned to; otherwise, the process is finished;

Step 114-4, the terminal continues to obtain a length of the current data element, and obtains a content of the current data element according to the length of the current data element, and then the terminal makes the current data element, the length of the current data element and the content of the current data element as the data recovery data object list related data;

for instance, the data recovery data object list related data obtained by the terminal from the current record is DF 81 13 04 81 06 2A 95;

Step 115, the terminal obtains a recovering application command according to the data recovery data object list related data, and sends the recovering application command to the smart card;

specifically, the terminal obtains the content of the data recovery data object list related data from the data recovery data object list related data, and the terminal obtains the recovering application command according to a type of the recovering application command, a command code, a first parameter, a second parameter and the content of the data recovery data object list related data;

for instance, the data recovery data object list related data is DF 81 13 04 81 06 2A 95, the terminal obtains the tag of the data recovery data object list related data, which is DF 81 13, from the data recovery data object list related data, and obtains data at the next byte of the tag of the data recovery data object list related data as the length of the data recovery data object list related data, which is 04; continues to obtain data according to the length of the data recovery data object list related data as the content of the data recovery data object list related data, which is 81 06 2A 95; the terminal obtains the recovering application command, which is 80 D0 00 00 04 81 06 2A 95, according to the command type of the recovering application command, the command code, the first parameter, the second parameter and the content of the data recovery data object list related data;

Step 116, the terminal determines whether a second response data returned from the smart card is received, if yes, goes to Step 117; otherwise, finishes the process;

specifically, the terminal does not receive the second response data returned from the smart card because of timeout or communication error;

in Embodiment 2, in the case that the terminal dose not receive the second response data, the method further includes: the terminal displays the information that the transaction fails and restart the transaction;

Step 117, the terminal determines whether a response code in the second response data is correct, if yes, goes to Step 118; otherwise, goes to Step 120;

specifically, the terminal obtains data at the last two bytes of the second response data as the response code, and determines whether the response code is the first preset data, if yes, the response code is correct; otherwise, the response code is incorrect; for instance, the first preset data is 0x9000;

for instance, the second response data is 77 81 88 9F 27 01 40 9F 36 02 00 02 9F 4B 7C 66 12 60 9D CE A3 27 80 0A 7A E7 4F 2A 18 E8 94 1E 0C 63 DD 4A 41 26 ED 75 5B B9 DF 96 8C 43 4C C1 00 D7 DF 82 D0 61 B6 19 35 51 D1 2F 5E C4 26 88 11 6E E2 5A 46 95 77 ED 78 6C 30 62 8E 7C 70 2A 15 2F 6E 0F 86 D8 69 57 4B 9D 58 64 35 F5 58 54 61 F4 81 DC 2F FB 9B DF A6 68 E0 05 90 13 5E A3 29 1B B8 28 A2 03 B4 AC 30 EE C3 3F A0 99 4A 04 02 7E 83 6D BE 03 3F61 94 C7 AF 90 00;

Step 118, the terminal updates data in the terminal database according to each data element in the current record;

for instance, the current record is
FF8101818B9F02060000000015009F0306000000000-0005A0854133390000066775F3401 02DF810715000-000000000000000015003F000000600881062A959F3403-3F0000DF8113048106 2A959F1E081122334455667788-DF81110A000000001500000008009F33030000089F1A0-2097 89F3501229505000000000009A031505299F21031-524399C01009F370481062A95;

Step 119, the terminal deletes the current record from the incomplete transaction log in the terminal, the transaction is completed, and the process is finished;

for instance, the incomplete transaction log is 9F4D020101FF8101818B9F02060000000015009F030-60000000000005A08541333900000 66775F34010-2DF810715000000000000000000015003F00000060088-1062A959F34033F0000D F81130481062A959F1E08112-2334455667788DF81110A0000000015000000008009F33-030000 089F1A0209789F3501229505000000000009-A031505299F21031524399C01009F370481062A9 5;

after the current record is deleted, the incomplete transaction log is 9F4D020101;

Step 120, the terminal obtains the generating application ciphertext command according to the card risk management data object list, and sends the generating application ciphertext command to the smart card;

specifically, the terminal obtains the card risk management data object list by reading records from the smart card;

Step 121, the terminal determines whether a third response data returned from the smart card is received, if yes, goes to Step 122; otherwise, goes to Step 123;

specifically, the terminal does not receive the third response data includes that because of timeout or communication error, the terminal does not receive the third response;

Step 122, the terminal deletes the current record from the incomplete transaction log in the terminal, the transaction is completed and the process is finished;

Step 123, the terminal deletes the current record from the incomplete transaction log in the terminal;

Step 124, the terminal generates the incomplete transaction temporary record according to the data build data recovery data object list related data of the current transaction and the built data recovery data object list related data;

specifically, the terminal obtains data recovery data object list by reading records from the smart card, and obtains the tag and the length of the data element from the data recovery data object list, and looks up a value of a corresponding data element from the data of the current transaction according to the tag and the length of the data element, and builds the data recovery data object list related data according the found value of the data element;

for instance, the incomplete transaction temporary record includes: a log entry, an authorized amount, other amount, an application primary account number, an application primary account number serial number, reading the balance before generating application ciphertext, a card risk management data object list related data, a verification result of the card holder, a data recovery data object list related data, a data storage abstract, an integrated data storage status, a terminal serial number, processing options data object list relate data, a reference control parameter, a terminal capacity, a terminal state code, a type of terminal, a verification result of terminal, a transaction category code, a transaction currency code, a transaction date, a transaction time, a type of transaction and a casual number;

for instance, the incomplete transaction temporary record is
FF8101818B9F02060000000015009F03060000000000-0005A08541333900000 15135F3401 01DF81071500-00000000000000000015003F00000060008701FF1CA9F340-33F0000DF811304701 FF1CA9F1E08112233445566-7788DF81110A0000000015000000008009F33030000089-F1A020 9789F3501229505000000000009A031505299F2-1031523019C01009F3704701FF1CA;

Step 125, the terminal determines whether the number of the incomplete transaction log records in the terminal is just the same as the maximum number of the incomplete transaction log records, if yes, goes to Step 126; otherwise, goes to Step 127;

for instance, the terminal looks up the record tag from the incomplete transaction log, the number of the incomplete transaction log records in the terminal is 1 in the case that one record tag is found; and the number of the incomplete transaction log records in the terminal is just the same as the maximum number of the incomplete transaction log records in the case that the maximum number of the incomplete transaction log records is 1, and Step 126 is executed;

Step 126, the terminal looks up the earliest record from the incomplete transaction log according to the transaction date and the transaction time, and returns the earliest record to the background system, and updates the earliest transaction record according to the temporary record of the incomplete transaction;

specifically, that the terminal looks up the earliest transaction record from the incomplete transaction log according to the transaction date and the transaction time includes:

Step 126-1, the terminal obtains the first record from the incomplete transaction log as a current record and the earliest transaction record, and obtains the transaction date from the earliest transaction record according to the tag and the length of the transaction date, and obtains the transaction time from the earliest transaction record according to the tag and the length of the transaction time;

Step 126-2, the terminal determines whether any record behind the current record exists in the incomplete transaction log, if yes, the next record of the current record is made as a current record, and Step 126-3 is executed; otherwise, the earliest transaction record is found;

Step 126-3, the terminal obtains the transaction date from the current record according to the tag and the length of the transaction date, and obtains the transaction time from the current record according to the tag and the length of the transaction time;

Step 126-4, the terminal determines whether the current record is earlier than the earliest transaction record according to the transaction date and the transaction time in the current record and the transaction date and the transaction time in the earliest transaction record, if yes, the current record is made as the earliest transaction record, and Step 126-2 is returned to; otherwise, Step 126-2 is returned to;

for instance, the incomplete transaction log in the terminal is
9F4D020101FF8101818B9F02060000000015009F030-60000000000005A08541333900000 15135F34010-2DF810715000000000000000000015003F00000060088810-62A959F34033F0000D F81130481062A959F1E0811223-34455667788DF81110A0000000015000000008009F3303-0000 089F1A0209789F3501229505000000000009A03-1505299F21031524399C01009F370481062A9 5;

the transaction date obtained from the earliest transaction record is 150529 in the case that the tag of the transaction date is 9A and the length of the transaction date is 03; the transaction time obtained from the earliest transaction record is 152439 in the case that the tag of the transaction time is 9F21 and the length of the transaction time is 03; thus, the earliest transaction record found in the incomplete transaction log is
FF8101818B9F02060000000015009F03060000000000-005A08541333390000015135F3401 02DF8107150000000-0000000000015003F0000006000881062A959F34033F000-0DF8113048106 2A959F1E0811223344556677888DF811-

10A0000000015000000008009F33030000089F1A02097
89F350122950500000000009A031505299F2103152439-
9C01009F370481062A95;

the found record is deleted, and after the incomplete transaction temporary record is stored in the incomplete transaction log, the incomplete transaction log is 9F4D020101FF8101818B9F02060000000015009F03-
060000000000005A08541333900000 66775F340101-
DF8107150000000000000000015003F00000006008701-
FF1CA9F34033F0000D F811304701FF1CA9F1E081-
122334455667788DF81110A0000000015000000008009F-
33030000 089F1A0209789F35012295050000000009A-
031505299F21031523019C01009F3704701FF1C A;

in Embodiment 2, Step 126 further includes: the terminal displays the information that the transaction fails and restart the transaction;

Step 127, the terminal stores the temporary records into the incomplete transaction log sequentially, and the process is finished;

in Embodiment 2, Step 127 may further include: the terminal displays the information that the transaction fails and restart the transaction;

in Embodiment 2, the obtained data by the terminal by reading records from the smart card before the incomplete transaction is recovered includes: the data recovery data object list, the card risk management data object list, the primary account number of the current transaction, and the primary account number serial number of the current transaction;

besides, in Embodiment 2, that the terminal clears records in the incomplete transaction log on time specifically includes:

Step 201, the terminal obtains the first record from the incomplete transaction log in the terminal as the current record;

Step 202, the terminal obtains the transaction date and the transaction time from the current record, and determines whether the current record exceeds the time limit according to the obtained transaction date and the transaction time, if yes, goes to Step 203; otherwise, goes to Step 204;

Step 202 specifically includes:

Step 202-1, the terminal obtains the transaction date and the transaction time from the current record according to the tag of the transaction date and the tag of the transaction time;

Step 202-2, the terminal determines whether the obtained transaction date is just the same as the current date in the terminal, if yes, goes to Step 202-3; otherwise, the current record exceeds the time limit;

Step 202-3, the terminal determines whether a difference between the current time in the terminal and the obtained transaction time is larger than the second preset value, if yes, the current record exceeds the time limit; otherwise, the current record does not exceed the time limit;

for instance, the second preset value is 60;

Step 203, the terminal returns the current record to the background system, and deletes the current record, and goes back to Step 201;

Step 204, the terminal determines whether any record exists behind the current record in the incomplete transaction log, if yes, the next record of the current record is made as a current record, and Step 202 is returned to; otherwise, the process is finished;

for instance, the period set by the terminal for clearing the incomplete transaction log on time is 1 min; in addition, the terminal triggers a process of clearing records in the incomplete transaction log by receiving a clearing signal.

In Embodiment 2, it provides a method for recovering an incomplete transaction, by which, the incomplete transaction can be recovered, and data in the smart card is protected from being processed repeatedly in the incomplete transaction.

Embodiment 3

Figure 5:
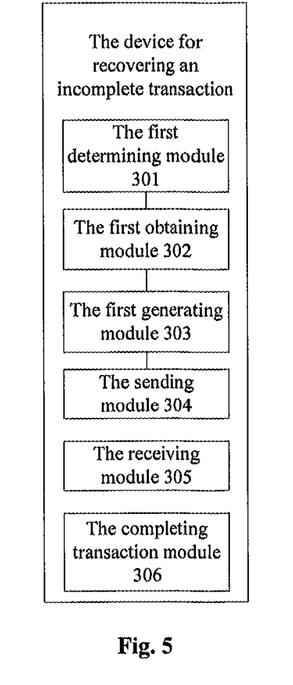
FIG. 5 shows a module chart of a device for recovering an incomplete transaction according to Embodiment 3 of the present invention.

It provides a device for recovering an incomplete transaction according to Embodiment 3 of the present invention, as shown in FIG. 5, includes: a first determining module 301, a first obtaining module 302, a first generating module 303, a sending module 304, a receiving module 305 and a completing transaction module 306;

the first determining module 301 is configured to determine whether any record matching with the current transaction identification exists in the incomplete transaction log;

the first obtaining module 302 is configured to obtain data recovery data object list related data from the record matching with the current transaction identification when the first determining module 301 determines that there exists record matching with the current transaction identification in the incomplete transaction log;

the first generating module 303 is configured to generate a recovery application command according to the data recovering data object list related data obtained by the first obtaining module 302;

the sending module 304 is configured to send the recovery application command generated by the first generating module 303 to the smart card;

the receiving module 305 is configured to receive a second response data returned by the smart card;

the completing transaction module 306 is configured to complete the transaction according to the records in the incomplete transaction log and data in the terminal database.

The said device further includes a second determining module and a second generating module;

the second determining module is configured to determine whether any record exists in the incomplete transaction log in the terminal, if yes, the first determining module 301 is triggered to work;

the second generating module is configured to obtain a generating application ciphertext command according to the card risk management data object list when the second determining module determines that no record exists in the incomplete transaction log in the terminal;

the sending module 304 is further configured to send the generating application ciphertext command generated by the second generating module to the smart card;

the receiving module 305 is further configured to receive the first response data returned by the smart card;

the completing transaction module 306 is further configured to complete the transaction after the first response data is received by the receiving module 305.

The device further includes a third determining module which is configured to determine whether transaction recovery is supported, if yes, the second determining module is triggered to work; otherwise, the second generating module is triggered to work.

The third determining module is specifically configured to determine whether any data recovery data object list, which is not empty, is read from the smart card, and whether transaction recovery is supported according to the current configuration of the terminal, if yes, transaction recovery is supported; otherwise, transaction recovery is not supported.

The second determining module is specifically configured to look up the record tag from the incomplete transaction log, and determine whether any record tag can be found, if yes, there exists record in the incomplete transaction log in the terminal; otherwise, no record exists in the incomplete transaction log in the terminal.

The device further includes a fourth determining module, a third generating module and a storing module;

the fourth determining module is configured to determine whether the receiving module 305 receives the first response data returned by the smart card;

the completing transaction module 306 is configured to complete the transaction when the fourth determining module determines that the first response data returned by the smart card is received by the receiving module 305;

the third generating module is configured to obtain data build data recovery data object list related data from the terminal database according to the data recovery data object list when the fourth determining module determines the first response data returned by the smart card is not received by the receiving module 305, and generate a temporary record of the incomplete transaction according to the data recovery data object list related data;

the storing module is configured to store the temporary record of the incomplete transaction into the incomplete transaction log.

The device further includes a fifth determining module, which is configured to whether transaction recovery is supported, if yes, the third generating module is triggered to work.

The fifth determining module is specifically configured to determine whether any data recovery data object list, which is not empty, can be read from the smart card, and determine whether transaction recovery is supported according to the current configuration of the terminal, if yes, transaction recovery is supported; otherwise, transaction recovery is not supported.

The storing module includes a first determining unit, a first storing unit and a second storing unit;

the first determining unit is configured to determine whether the number of the incomplete transaction log records in the terminal is just the same as the maximum number of the incomplete transaction log records;

the first storing unit is configured to look up the earliest transaction record from the incomplete transaction log according to the transaction data and the transaction time when the first determining unit determines that the number of the incomplete transaction log records in the terminal is just the same as the maximum number of the incomplete transaction log records, and return the earliest transaction record to the background system, and update the earliest transaction record according to the temporary record of the incomplete transaction;

the second storing unit is configured to store the temporary records of the incomplete transaction into the incomplete transaction log sequentially when the first determining unit determines that the number of the incomplete transaction log records is different from the maximum number of the incomplete transaction log records.

The first storing unit includes a first obtaining sub-unit, a first determining sub-unit, a second obtaining sub-unit and a second determining sub-unit;

the first obtaining sub-unit is configured to obtain the first record from the incomplete transaction log in the terminal as the current record and the earliest transaction record, and obtains the transaction date and the transaction time from the earliest transaction record according to a tag of the transaction date and a tag of the transaction time;

the first determining sub-unit is configured to determine whether any record behind the current record exists in the incomplete transaction log, if yes, the next record of the current record is made as a current record, and the second obtaining sub-unit is triggered to work; otherwise, the earliest record is found, and the earliest record is returned to the background system, and the earliest record is updated according to the temporary record of the incomplete transaction;

the second obtaining sub-unit is configured to obtain the transaction date and the transaction time from the current record according to the tag of the transaction date and the tag of the transaction time;

the second determining sub-unit is configured to determine the current record is earlier than the earliest transaction record according to the transaction date and the transaction time in the current record and the transaction date and the transaction time in the earliest transaction record, if yes, the current record is made as the earliest transaction record, and the first determining sub-unit is triggered to work; otherwise, the first determining sub-unit is triggered to work.

The first determining module 301 includes a first obtaining unit, a second determining unit, a third determining unit, a fourth determining unit and a fifth determining unit;

the first obtaining unit is configured to obtain the first record in the incomplete transaction log in the terminal as the current record;

the second determining unit is configured to determine whether a primary account number serial number of the current transaction is empty;

the third determining unit is configured to determine whether the primary account number of the current record is just the same as the primary account number of the current transaction and no primary account number serial number exists in the current record when the second determining unit determines that the primary account number serial number of the current transaction is empty, if yes, there exists record matching with the current transaction identification in the incomplete transaction log, and the first obtaining module 302 is triggered to work;

the fourth determining unit is configured to determine whether the primary account number in the current record is just the same as the primary account number of the current transaction, and whether the primary account number serial number in the current record is just the same as the primary account number serial number of the current transaction in the case that the second determining unit determines that the primary account number serial number of the current transaction is not empty, if yes, there exists a record which matches with the current transaction identification in the incomplete transaction log, and the first obtaining module 302 is triggered to work;

the fifth determining unit is configured to determine whether any record exists behind the current record in the incomplete transaction log in the terminal in the case that the determination determined by the third determining unit is no or the determination determined by the fourth determining module is no, if yes, the next record of the current record is made as a current record, and the second determining unit is triggered to work;

the first obtaining module 302 is specifically configured to obtain the data recovery data object list related data from the current record;

the completing transaction module 306 is specifically configured to complete the transaction according to the current record and the data in the terminal database.

The first obtaining module 302 includes a second obtaining unit, a sixth determining unit, a seventh determining unit and a third obtaining unit;

the second obtaining unit is configured to obtain the first data element from the record matching with the current transaction identification as a current data element;

the sixth determining unit is configured to determine whether a tag value of the current data element is the first preset value;

the seventh determining unit is configured to determine whether any data element exists behind the current data element in the record in the case that the sixth determining unit determines that the tag value of the current data element is not the first preset value, if yes, the next data element of the current data element is obtained as an updated current data element, and the sixth determining unit is triggered to work;

the third obtaining unit is configured to continue to obtain a length of the current data element in the case that the sixth determining unit determines that the tag value of the current data element is the first preset value, and continue to obtain a content of the current data element according to the length of the current data element, and the current data element, the length of the current data element and the content of the current data element are made by the terminal as the data recovery data object list related data.

The device includes a sixth determining module which is configured to determine whether the second response data returned from the smart card is received, if yes, the completing transaction module 306 is triggered to work.

The device further includes a seventh determining module, a second generating module, an eighth determining module, a third generating module and a storing module;

the seventh determining module is configured to determine whether a response code in the second response data is right, if yes, the completing transaction module 306 is triggered to work;

the second generating module is configured to generate a generating application ciphertext command according to the card risk management data object list in the case that the seventh determining module determines that the response code in the second response data is incorrect;

the sending module 304 is further configured to send the generating application ciphertext command generated by the second generating module to the smart card;

the receiving module 305 is further configured to receive a third response data returned by the smart card;

the eighth determining module is configured to determine whether the third response data returned from the smart card is received by the receiving module 305, if yes, delete records from the incomplete transaction log in the terminal;

the completing transaction module 306 is further configured to complete the transaction in the case that the eighth determining module determines the third response data returned from the smart card is received;

the third generating module is configured to generate a incomplete transaction temporary record according to the data build data recovery data object list related data of the current transaction and the data recovery data object list related data in the case that the eighth determining module determines that the third response data returned from the smart card is not received;

the storing module is configured to update records in the incomplete transaction log according to the incomplete transaction temporary record.

The storing module includes a first determining unit, a first storing unit and a second storing unit;

the first determining unit is configured to determine whether the number of the incomplete transaction log records is just the same as the maximum number of the incomplete transaction log records;

the first storing unit is configured to look up the earliest transaction record from the incomplete transaction log according to the transaction date and the transaction time in the case that the first determining unit determines that the number of the incomplete transaction log records is just the same as the maximum number of the incomplete transaction log records, and return the earliest transaction record to the background system, and update the earliest transaction record according to the incomplete transaction temporary record;

the second storing unit is configured to store the incomplete transaction temporary records into the incomplete transaction log sequentially in the case that the first determining unit determines that the number of the incomplete transaction log records is different from the maximum number of the incomplete transaction log records.

The completing transaction module 306 is specifically configured to update data in the terminal database according to each data element in the record, and delete records from the incomplete transaction log in the terminal, and complete the transaction according to the data in the terminal database; or, the completing transaction module 306 is specifically configured to complete the transaction according to each data element in the record and data in the terminal database, and delete the records from the incomplete transaction log in the terminal.

The device further includes a clearing module which is configured to clear records from the incomplete transaction log.

The clearing module includes a fourth obtaining unit, an eighth determining unit, a deleting unit and a ninth determining unit;

the fourth obtaining unit is configured to obtain the first record from the incomplete transaction log in the terminal as a current record;

the eighth determining unit is configured to obtain the transaction date and the transaction time from the current record, and determine whether the current record exceeds the time limit according to the transaction date and the transaction time;

the deleting unit is configured to return the current record to the background system when the eighth determining unit determines that the current record exceeds the time limit, and to delete the current record from the incomplete transaction log;

the ninth determining unit is configured to determine any record exists behind the current record in the incomplete transaction log when the eighth determining unit determines that the current record does not exceed the time limit, if yes, the next record of the current record is made as a current record, and the eighth determining unit is triggered to work.

The eighth determining unit includes a third obtaining sub-unit, a third determining sub-unit and a fourth determining sub-unit;

the third obtaining sub-unit is configured to obtain the transaction date and the transaction time from the current record according to the tag of the transaction data and the tag of the transaction time;

the third determining sub-unit is configured to determine whether the obtained transaction date is just the same as the current date in the terminal, if no, the current record exceeds the time limit;

the fourth determining sub-unit is configured to determine whether a difference between the current time in the terminal and the obtained transaction time is larger than the second preset value when the third determining sub-unit determines the obtained transaction date is just the same as the current date in the terminal, if yes, the record exceeds the time limit; otherwise, the current record does not exceed the time limit.

The Embodiments described herein are just a few preferable Embodiments of the present invention. On the basis of the Embodiments of the invention, all other related Embodiments made by those skilled in the art without any inventive work belong to the scope of protection as defined in the appended Claims of the invention.

The invention claimed is:

1. A device for recovering an incomplete transaction between a smart card and a computer terminal, and preventing data in the smart card from being processed repeatedly in the incomplete transaction, wherein the device comprises:
    a first means for determining whether any record matching with a current transaction identification exists in an incomplete transaction log stored in the computer terminal;
    a first means for obtaining data recovery object list related data from the record matching with the current transaction identification in case that the first means for determining determines that there exists a record, matching with the current transaction identification, in the incomplete transaction log;
    a first means for generating a recovering application command according to the data recovery object list related data obtained by the first means for obtaining;
    a means for sending the recovering application command generated by the first means for generating smart card;
    a means for receiving the second response data returned from the smart card; and
    a means for completing the transaction according to records in the incomplete transaction log and data in the terminal database,
    wherein the first means for obtaining comprises
    a second unit for obtaining the first data element from the record matching with the current transaction identification as the current data element;
    a sixth unit for determining whether a tag value of the current data element is the first preset value;
    a seventh means for determining whether any data element exists behind the current data element in the record in case that the six unit for determining determines that the tag value of the current data element is not the first preset value, if yes, obtaining a next data element of the current data element as an updated current data element, and triggering the sixth unit for determining work; and
    a third unit for obtaining a length of the current data element in case that the sixth unit for determining determines the tag value of the current data element is the first preset value, and continue to obtain a content of the current data element according to the length of the current data element, so that the terminal makes the current data element, the length of the current data element and the content of the current data element as the data recovery data object list related data.

2. The device claimed in claim 1, wherein the device further comprises
    a second means for determining whether any record exists in the incomplete transaction log in the terminal, if yes, triggering the first means for determining work; and
    a second means for generating a generating application ciphertext command according to a card risk management data object list in case that the second means for determining determines that no record exists in the incomplete transaction log in the terminal;
    the means for sending is further configured to send the generating application ciphertext command generated by the second means for generating to the smart card;
    the means for receiving is further configured to receive the first response data returned from the smart card; and
    the means for completing transaction is further configured to complete the transaction after the first response data is received by the means for receiving.

3. The device claimed in claim 1, wherein the first means for determining comprises
    a first unit for obtaining the first record from the incomplete transaction log as a current record;
    a second unit for determining whether a primary account number serial number of the current transaction is empty;
    a third unit for determining whether the primary account number in the current record is just the same as the primary account number of the current transaction and no primary account number serial number exists in the current record in case that the second unit for determining determines the primary account number serial number of the current transaction is empty, if yes, there exists a record matching with the current transaction identification in the incomplete transaction log, and the first means for obtaining is triggered to work;
    a fourth unit for determining whether the primary account number in the current record is just the same as the primary account number of the current transaction on one hand, and the primary account number serial number in the current record is just the same as the primary account number serial number of the current transaction on the other hand in case that the second unit for determining determines that the primary account number serial number of the current transaction is not empty, if yes, there exists a record matching with the current transaction identification in the incomplete transaction log, and the first means for obtaining is triggered to work;
    a fifth unit for determining whether any record exists behind the current record in the incomplete transaction log in the case that the determination either by the third unit for determining or by the fourth unit for determining is no, if yes, making the next record of the current record as a current record, and triggering the unit second for determining work;
    the first means for obtaining is specifically configured to obtain the data recovery object list related data from the current record; and
    the means for completing transaction is specifically configured to complete the transaction according to the current record and the data in the terminal database.

4. The device claimed in claim 1, wherein the device further comprises a sixth means for determining whether the second response data returned from the smart card is received, if yes, triggering the means for completing transaction to work.

5. The device claimed in claim 1, wherein the device further comprises:
    a seventh means for determining whether a response code in the second response data is correct, if yes, triggering the means for completing transaction to work;
    a second means for generating a generating application ciphertext command according to a card risk management data object list in case that the seventh means for determining determines the response code in the second response data is incorrect;

the means for sending is further configured to send the generating application ciphertext command generated by the second means for generating smart card;

the means for receiving is further configured to receive the third response data returned by the smart card;

an eighth means for determining whether the third response data returned from the smart card is received by the means for receiving, if yes, deleting the records from the incomplete transaction log;

the means for completing transaction is further configured to complete the transaction in case that the eighth means for determining determines the third response data returned from the smart card is received;

a third means for generating the incomplete transaction temporary record according to the data build data recovery object list related data of the current transaction and the data recovery object list related data in case that the eighth means for determining determines the third response data returned from the smart card is not received; and a means for storing records updated in the incomplete transaction log according to the incomplete transaction temporary record.

6. The device claimed in claim 1, wherein the means for completing transaction is specifically configured to update the data in the terminal database according to each data element in the record, and delete the record from the incomplete transaction log, and complete transaction according to the data in the terminal database.

7. The device claimed in claim 1, wherein the means for completing transaction is specifically configured to complete the transaction according to each data element in the record and the data in the terminal database, and delete the record from the incomplete transaction log.

8. The device claimed in claim 1, wherein the device further comprises a means for clearing records in the incomplete transaction log.

* * * * *